(12) United States Patent
Glückler et al.

(10) Patent No.: US 11,794,575 B2
(45) Date of Patent: Oct. 24, 2023

(54) MOTOR VEHICLE TRANSMISSIONS, IN PARTICULAR ELECTRIC VEHICLE TRANSMISSIONS

(71) Applicant: ZF Friedrichshafen AG, Friedrichshafen (DE)

(72) Inventors: Johannes Glückler, Friedrichshafen (DE); Stefan Renner, Ludwigshafen (DE); David Rittler, Neukirch (DE); Stefan Spühler, Friedrichshafen (DE)

(73) Assignee: ZF Friedrichshafen AG, Friedrichshaf (DE)

( * ) Notice: Subject to any disclaimer, the term of this patent is extended or adjusted under 35 U.S.C. 154(b) by 0 days.

(21) Appl. No.: 18/154,922

(22) Filed: Jan. 16, 2023

(65) Prior Publication Data

US 2023/0226905 A1     Jul. 20, 2023

(30) Foreign Application Priority Data

Jan. 20, 2022 (DE) ..................... 10 2022 200 607.0

(51) Int. Cl.
*B60K 1/00* (2006.01)
*B60K 17/08* (2006.01)
*B60K 17/16* (2006.01)

(52) U.S. Cl.
CPC ................ *B60K 17/08* (2013.01); *B60K 1/00* (2013.01); *B60K 17/16* (2013.01); *B60K 2001/001* (2013.01)

(58) Field of Classification Search
CPC .......... B60K 1/00; B60K 17/16; B60K 17/18; F16H 3/62; F16H 3/66; F16H 2200/201; F16H 2200/2038
See application file for complete search history.

(56) References Cited

U.S. PATENT DOCUMENTS

| 5,319,555 A | 6/1994 | Iwaki et al. |
| 5,484,351 A | 1/1996 | Zhang et al. |
| 5,595,551 A | 1/1997 | Hedstrom et al. |
| 5,778,329 A | 7/1998 | Officer et al. |
| 5,952,586 A | 9/1999 | Matui et al. |

(Continued)

FOREIGN PATENT DOCUMENTS

| DE | 10 2016 220 143 A1 | 4/2018 |
| DE | 10 2018 122 936 A1 | 3/2020 |

(Continued)

OTHER PUBLICATIONS

German Patent Office, Search Report issued in German patent application No. 10 2022 200 615.1 (dated Sep. 1, 2022).

(Continued)

*Primary Examiner* — Edwin A Young
(74) *Attorney, Agent, or Firm* — Finch & Maloney PLLC (57) ABSTRACT

The invention relates to a motor vehicle transmission (6) having a drive input shaft (9), a drive output shaft (10), a first planetary gearset (P1), a second planetary gearset (P2), and a third planetary gearset (P3), where the drive input shaft (9) is provided for coupling to an electric machine (5). Furthermore, at least functionally a first shifting element (A), a second shifting element (B), and a third shifting element (C) are provided. In addition, the invention relates to a drive unit (4), a drive axle (3) and an electric vehicle.

16 Claims, 3 Drawing Sheets

(56) References Cited

U.S. PATENT DOCUMENTS

| | | | |
|---|---|---|---|
| 6,022,292 | A | 2/2000 | Goodnight |
| 6,071,211 | A | 6/2000 | Liu et al. |
| 6,379,283 | B1 | 4/2002 | Cullen |
| 7,211,022 | B2* | 5/2007 | Tiesler .................. F16H 3/663 475/275 |
| 7,444,225 | B2 | 10/2008 | Ito |
| 7,452,296 | B2 | 11/2008 | Bucknor et al. |
| 11,135,914 | B2 | 10/2021 | Gluckler et al. |
| 2005/0026738 | A1* | 2/2005 | Diosi ...................... F16H 3/66 475/275 |
| 2007/0238574 | A1* | 10/2007 | Gumpoltsberger ....... F16H 3/66 475/284 |
| 2013/0203549 | A1* | 8/2013 | Mellet ...................... F16H 3/66 475/275 |
| 2015/0031498 | A1* | 1/2015 | Beck ...................... F16H 3/725 475/317 |
| 2016/0025189 | A1 | 1/2016 | Kaltenbach et al. |
| 2016/0061304 | A1 | 3/2016 | Kaltenbach et al. |
| 2020/0282827 | A1 | 9/2020 | Kaltenbach et al. |

FOREIGN PATENT DOCUMENTS

| | | |
|---|---|---|
| DE | 10 2019 129 633 A1 | 5/2021 |
| EP | 0 683 336 B1 | 1/1998 |
| WO | 2008094115 A1 | 8/2008 |
| WO | 2015/082166 A1 | 6/2015 |
| WO | 2020/259874 A1 | 12/2020 |

OTHER PUBLICATIONS

German Patent Office, Search Report issued in German patent application No. 10 2022 200 607.0 (dated Sep. 2, 2022).

United States Patent and Trademark Office, Notice of Allowance issued in U.S. Appl. No. 18/154,920 (dated Jun. 16, 2023).

* cited by examiner

|    | A | B | C |
|----|---|---|---|
| G1 | X |   |   |
| G2 |   | X |   |
| G3 |   |   | X |

Fig. 3

MOTOR VEHICLE TRANSMISSIONS, IN PARTICULAR ELECTRIC VEHICLE TRANSMISSIONS

RELATED APPLICATIONS

This application claims the benefit of and right of priority under 35 U.S.C. § 119 to German Patent Application no. 10 2022 200 607.0, filed on 20 Jan. 2022, the contents of which are incorporated herein by reference in its entirety.

BACKGROUND

The invention relates to a motor vehicle transmission, in particular an electric vehicle transmission, comprising a drive input shaft which is provided for connection to a drive machine, a drive output shaft, and a first planetary gearset, a second planetary gearset, and a third planetary gearset, each of which has a first element, a second element, and a third element in the form, respectively, of a sun gear, a planetary web, and a ring gear, wherein at least functionally a first shifting element, a second shifting element, and a third shifting element are provided, and wherein the first element of the first planetary gearset is connected rotationally fixed to the drive input shaft and the second element of the third planetary gearset is connected rotationally fixed to the drive output shaft. In addition, the invention relates to a drive unit with a motor vehicle transmission as mentioned above, a drive axle, and an electric vehicle.

In electric vehicles, a motor vehicle transmission is provided in part of a respective drive-train between an electric machine and drive wheels of the electric vehicle in order to transmit a drive movement of the electric machine to the drive wheels, particularly in the slow range. Besides single-gear transmissions, transmissions are also used in electric utility vehicles in which two or more gears can be engaged.

WO 2015/082166 A1 describes a drive unit for an electric vehicle, wherein the said drive unit combines an electric machine and a motor vehicle transmission. Besides three planetary gearsets the motor vehicle transmission comprises a plurality of shifting elements by the selective actuation of which a drive input shaft and a drive output shaft of the motor vehicle transmission can be coupled to one another with various gears engaged between them. In this case the drive input shaft is connected rotationally fixed to a rotor of the electric machine. The planetary gearsets consist in each case of a first element, a second element, and a third element, of which one is in the form of a sun gear, one in the form of a planetary web, and one in the form of a ring gear. Of the elements of the planetary gearsets, one is connected rotationally fixed to the drive input shaft and thus also to the rotor of the electric machine, whereas another element is connected permanently and rotationally fixed to the drive output shaft.

SUMMARY

Starting from the above-described prior art, it is now the purpose of the present invention to provide a motor vehicle transmission with a compact structure, by means of which various gears can be obtained. In particular, the said motor vehicle transmission should be suitable for use in a drive-train of an electric vehicle.

This objective is achieved from embodiments disclosed herein. Advantages and further embodiments will be apparent in light of the present disclosure, which relates to a vehicle transmission, in particular an electric vehicle transmission. The present disclosure also relates to a drive unit which comprises a motor vehicle transmission according to the invention, to a drive axle with such a drive unit, and to an electric vehicle.

According to the invention, the motor vehicle transmission comprises a drive input shaft provided for connection to a drive machine, a drive output shaft, and a first planetary gearset, a second planetary gearset, and a third planetary gearset, each of which comprises a first element, a second element, and a third element in the form, respectively, of a sun gear, a planetary web, and a ring gear. Furthermore, at least functionally a first shifting element, a second shifting element, and a third shifting element are provided. Moreover, the first element of the first planetary gearset is connected rotationally fixed to the drive input shaft whereas the second element of the third planetary gearset is connected rotationally fixed to the drive output shaft.

In the context of the invention a "shaft" is understood to be a component that can rotate, by way of which a power flow can be transmitted between components, such that for that purpose, if necessary, an associated at least functionally provided shifting element has to be actuated. The shaft concerned can connect components axially or radially or even both axially and radially to one another. Thus, the shaft concerned can also be present as an intermediate element by way of which only a radial connection is produced.

In the context of the invention "axial" means an orientation in the direction of a central longitudinal axis of the transmission, parallel to which rotation axes of rotatable components of the transmission, in particular of the shafts of the transmission and the elements of the planetary gearsets, are arranged. Then, "radial" is understood to mean an orientation in the direction of the diameter of a respective component of the transmission.

In the motor vehicle transmission according to the invention the drive input shaft is provided in order to form a drive-side coupling to a drive machine. For that purpose, the drive input shaft is in particular provided with a connection point at which a coupling of the drive input shaft to the drive machine can be formed. The said coupling is located between the drive machine and the drive input shaft in such a form that in the assembled condition of the motor vehicle transmission there is always a fixed rotation speed ratio between a rotation speed of the drive input shaft of the motor vehicle transmission and a rotation speed of the drive machine. Thus, in the context of the invention, between the drive input shaft and the drive machine there can, if necessary, be provided at least one further transmission ratio step, such as a spur gear step and/or a planetary step, by way of which a pre-transmission ratio of a rotation movement of the drive machine to the drive input shaft can be obtained. Particularly preferably, however, the drive input shaft of the motor vehicle transmission according to the invention is connected to the drive machine in a rotationally fixed manner so that during operation the drive machine and the drive input shaft rotate at the same rotation speed.

The motor vehicle transmission is in particular a transmission for an electric vehicle and is designed to be connected by way of the drive input shaft to a drive machine in the form of an electric machine. As described above, a rotor of the electric machine can be coupled via at least one intermediate transmission ratio step to the drive input shaft of the transmission. Particularly preferable, however, in the assembled condition of the motor vehicle transmission according to the invention a rotor of the electric machine is connected directly to the drive input shaft in a rotationally fixed manner.

In the motor vehicle transmission according to the invention, the drive input shaft and the drive output shaft in particular are arranged coaxially with one another, and also preferably the planetary gearsets too are positioned coaxial with the drive input shaft and the drive output shaft. In that way the structure of the motor vehicle transmission can be made particularly compact in the radial direction.

The planetary gearsets consist in each case of a first element, a second element, and a third element, such that the elements of the individual planetary gearsets are in each case a sun gear, a planetary web, and a ring gear, respectively. Particularly preferable, the individual planetary gearsets are minus-planetary gearsets in which the respective planetary web carries at least one rotatable planetary gearwheel which meshes both with the associated sun gear and with the associated ring gear. Thus, when the planetary gearsets are in the form of minus-planetary gearsets, then in particular the first element of the planetary gearset concerned is its sun gear, the second element of the planetary gearset concerned is its planetary web, and the third element of the planetary gearset concerned is its ring gear.

Alternatively, in principle one or more of the planetary gearsets could be made as a plus-planetary gearset. In that case, on the planetary web concerned at least one pair of planetary gearwheels is mounted to rotate, of which planetary gearwheels one meshes with the associated sun gear and one with the associated ring gear. Moreover, the planetary gearwheels of the at least one planetary gearwheel pair mesh with one another. Otherwise than in a minus-planetary gearset design, the first element of the planetary gearset concerned is then preferably the sun gear, the second element of the planetary gearset concerned is the ring gear, and the third element of the planetary gearset concerned is the planetary web. Compared with a minus-planetary gearset design, a stationary gear ratio of the planetary gearset concerned also has to be increased by one. As already described above, however, in the context of the invention all the planetary gearsets are preferably minus-planetary gearsets. It is also preferable in the electric vehicle transmission according to the invention to provide exactly three planetary gearsets.

The motor vehicle transmission according to the invention comprises, at least functionally, a first shifting element, a second shifting element, and a third shilling element, by the selective actuation of which, in particular, different gears between the drive input shaft and the drive output shaft can be obtained. Particularly preferable, in the motor vehicle transmission according to the invention, in terms of their function exactly three shifting elements are provided, such that by means of these shifting elements exactly three different gears can then preferably be obtained between the drive input shaft and the drive output shaft. In principle, however, within the scope of the invention, besides the first, second, and third shifting elements one or more further shifting elements could be provided, at least functionally.

That a particular shifting element is provided "at least functionally" means, in the context of the invention, that in the motor vehicle transmission according to the invention at least the respective function of the shifting element concerned is reproduced. In this, the shifting elements can specifically be physically present as individual shifting elements, or their function is reproduced by some other component such as a shifting device. A component that reproduces the said function can then combine the functions of two or more shifting elements in a single device.

The invention now incorporates the technical principle that the third element of the third planetary gearset is immobilized. Furthermore, the third element of the second planetary gearset is connected rotationally fixed to the second element of the third planetary gearset and to the output shaft. The second element of the first planetary gearset and the first element of the second planetary gearset are connected rotationally fixed to one another, whereas the second element of the second planetary gearset and the first element of the third planetary gearset are connected rotationally fixed to one another. The third element of the first planetary gearset can be immobilized by means of the first shifting element and, by means of the second shifting element, it can be connected rotationally fixed to the second element of the second planetary gearset and to the first element of the third planetary gearset. Finally, two of the elements of the first planetary gearset can be brought into rotationally fixed connection with one another by means of the third shifting element.

Correspondingly, in the electric vehicle transmission according to the invention the first element of the first planetary gearset is permanently connected rotationally fixed to the drive input shaft, so that the drive input shaft and the said first element of the first planetary gearset always rotate at the same speed. Furthermore the drive output shaft, the second element of the third planetary gearset, and the third element of the second planetary gearset are permanently connected rotationally fixed to one another, so that the second element of the third planetary gearset, the third element of the second planetary gearset, and the drive output shaft also always rotate at the same speed. The third element of the third planetary gearset is permanently immobilized, so that the third element of the third planetary gearset is permanently prevented from rotating. Furthermore, the second element of the first planetary gearset and the first element of the second planetary gearset are permanently connected rotationally fixed to one another and consequently always rotate together, while the second element of the second planetary gearset and the first element of the third planetary gearset always rotate at the same speed since the second element of the second planetary gearset and the first element of the third planetary gearset are permanently connected rotationally fixed to one another.

The individual permanent rotationally fixed connections are, in the context of the invention, preferably formed in each case by way of an intermediate shaft, which can be present in one or more parts. Furthermore, in the context of the invention a particular design can be considered, in which the shaft concerned is made integrally with one or even both of the components that it connects in a rotationally fixed manner, the latter option being realized in particular when the components of the transmission that are permanently connected to one another are arranged spatially closely adjacent to one another.

Closing the first shifting element immobilizes the third element of the first planetary gearset so that it is prevented from rotating. On the other hand, if the second shifting element is changed to its closed condition, the third element of the first planetary gearset is connected rotationally fixed to the second element of the second planetary gearset, so that the third element of the first planetary, the second element of the second planetary gearset and the first element of the third planetary gearset rotate together. In its closed condition the third shifting element produces a rotationally fixed connection between two elements of the first planetary gearset, and this blocks the first planetary gearset and results in its rotation as a block.

The respective permanently immobilized condition of the third element of the third planetary gearset and of the third element of the first planetary gearset by means of the first shifting element, are produced in particular because the element concerned is connected rotationally fixed to a permanently fixed structural element or will be connected rotationally fixed thereto. In this case the said permanently fixed structural element is preferably a transmission housing of the motor vehicle transmission, part of the transmission housing, or a component connected rotationally fixed thereto. The third element of the third planetary gearset in this case can also be made integrally with the permanently fixed structural element.

In an actuated condition of the at least functionally present third shifting element, two of the three elements of the first planetary gearset are connected rotationally fixed to one another, so that the first planetary gearset is blocked. In the context of the invention, in the actuated condition of the at least functionally present third shifting element, specifically the first element and the second element of the first planetary gearset, or the first element and the third element of the first planetary gearset, or the second element and the third element of the first planetary gearset, can be connected rotationally fixed to one another.

The design of a motor vehicle transmission according to the invention has the advantage that by means of the shifting elements, a number of different gears can be engaged between the drive input shaft and the drive output shaft, so that in the assembled condition of the motor vehicle transmission, a drive input movement of an upstream drive machine can be transmitted with different transmission ratios. Particularly when the motor vehicle transmission is combined with a drive machine in the form of an electric machine, such a combination can provide a drive unit suitable for use in an electric vehicle. By virtue of the configuration of the motor vehicle transmission according to the invention this can be done with a structure that is compact overall, so that even a direct arrangement can be configured in the area of the electric vehicle in which the drive movement has to be produced, for example at a respective drive axle.

With the motor vehicle transmission according to the invention a first gear between the drive input shaft and the drive output shaft is engaged by closing the first shifting element, whereas on the other hand a second gear between the drive input and the drive output shafts can be engaged by actuating the second shifting element. In addition, a third gear between the drive input and the drive output shafts can be engaged by closing the third shifting element. Advantageously, this enables a suitable provision of gears of the motor vehicle transmission by correspondingly guiding the power flow via the three planetary gearsets. In this case sequential gearshifts between the gears can be accomplished by changing over between two shifting elements. Thus, to change from the first gear to the second gear the first shifting element has to be opened and thereafter the second shifting element has to be actuated, whereas to change from the second gear to the third gear the second shifting element has to be opened and thereafter the third shifting element must be closed.

Preferably, the shifting elements are in the form of interlocking shifting elements, particularly preferably ones designed as unsynchronized claw-type shifting elements. Making the shifting elements in the form of interlocking shifting elements has the advantage that in an open condition of the shifting element concerned no, or only very slight, drag losses occur at the said shifting element. This improves the efficiency of the motor vehicle transmission. Alternatively, however, one or more of the shifting elements can also be interlocking shifting elements in the form of locking synchronizations. As a further alternative, one or even more of the shifting elements can be in the form of frictional shifting elements, in that case particularly preferably disk-type shifting elements. Advantageously, the shifting element concerned can then be powershifted.

In an embodiment of the invention, when it is actuated the third shifting element connects the third element of the first planetary gearset rotationally fixed to the second element of the first planetary gearset or to the first element of the first planetary gearset. In that case, the first planetary gearset is blocked in the actuated condition of the at least functionally present third shifting element, because the third element of the first planetary gearset is brought into rotationally fixed connection either with the second element of the first planetary gearset or with the first element of the first planetary gearset.

In a further development of a combination of the two above-mentioned variants, the first, second, and third shifting elements are formed by a shifting device whose coupling element can be moved to a first shift position, a second shift position, and a third shift position. In this case, in its first shift position the coupling element functionally reproduces an actuated condition of the first shifting element and immobilizes the third element of the first planetary gearset. In its second shift position the coupling element functionally reproduces an actuated condition of the second shifting element and connects the third element of the first planetary gearset rotationally fixed to the second element of the second planetary gearset and to the first element of the third planetary gearset. Furthermore, in its third shifting position the coupling element functionally reproduces an actuated condition of the third shifting element, since the coupling element brings the third element of the first planetary gearset into rotationally fixed connection either with the second element of the first planetary gearset or with the first element of the first planetary gearset. Reproducing the functions of the first, second, and third shifting elements by a shifting device has the advantage that by such means, the respective rotationally fixed connections can be realized in a compact manner and with a small number of structural elements.

Particularly preferably, between the shift positions the coupling element can also be moved to a neutral position in each case, such that in the individual neutral positions no coupling of the third element of the first planetary gearset takes place. Thus, when the coupling element is between the first shift position and the second shift position it is in a first neutral position, and when the coupling element is between the second and third shift positions it is in a second neutral position.

Particularly preferable, the coupling element of the shifting device is in the form of a sliding sleeve, which on a guiding tooth array in each case is guided in a rotationally fixed manner and axially displaceably on teeth, wherein the said teeth are connected rotationally fixed to the third element of the first planetary gearset. Furthermore, such a coupling element in particular is provided with at least one engagement tooth array, with which the coupling element engages at the shift position concerned in associated teeth. The teeth are in each case connected rotationally fixed to the component or components of the motor vehicle transmission which, at the individual shift position, are to be connected rotationally fixed by means of the coupling element to the third element of the first planetary gearset. Particularly preferably, the coupling element in this case has three engagement tooth arrays.

In accordance with a possible design of the invention, the output shaft is coupled to a differential gear system. In this case the said differential gear system is a transverse differential which, again preferably, is in the form of a conical gear differential. By way of the transverse differential a drive movement transmitted to the output shaft of the motor vehicle transmission is preferably distributed to drive output shafts of a drive axle of the electric vehicle. In particular, the output shaft is in this case coupled to a differential cage of the differential gear system, wherein this coupling can be effected if the output shaft is connected rotationally fixed to the differential cage or if it carries a spur gear which meshes with a drive actuator gear of the differential cage. Moreover, the differential gear system can also be a longitudinal differential by way of which drive power can be distributed to more than one drive axle.

According to an embodiment of the invention, the planetary gearsets are arranged after a connection point of the drive input shaft that serves to couple the drive input shaft to the drive machine, in a sequence of first planetary gearset, second planetary gearset, and third planetary gearset. This makes possible a suitable structure of the electric vehicle transmission according to the invention. In the context of the invention, however, in the axial direction after the connection point the planetary gearsets can be arranged in some other sequence.

In a further development of the above-mentioned embodiment, the first shifting element, the second shifting element, and the third shifting element are arranged axially between the first planetary gearset and the second planetary gearset. If the first, second, and third shifting elements are in the form of a shared shifting device, then the said shifting device is preferably positioned axially between the first planetary gearset and the second planetary gearset. In the latter case a positioning actuator by means of which the coupling element of the shifting device that functionally reproduces the first, second, and third shifting elements can be moved to the first shift position, the second shift position, and the third shift position, can also be positioned axially between the first and second planetary gearsets. Particularly preferable, in that case the said positioning actuator is arranged radially on the outside of the first and second planetary gearsets and is connected to the coupling element by an intermediate shifting rod.

An object of the invention is also a drive unit, which is preferably an electric axle-drive unit and which, besides an electric machine, comprises a motor vehicle transmission according to one or more of the above-described variants. A rotor of the electric machine is coupled to a drive input shaft of the motor vehicle transmission, this coupling in particular being a rotationally fixed connection between the rotor of the electric machine and a connection point of the drive input shaft. Alternatively, however, one or more intermediate gear ratio steps could be provided between the drive input shaft of the motor vehicle transmission and the rotor of the electric machine, these gear ratio steps being in the form of spur gear stages or planetary stages. In the context of the invention the electric machine in particular can be operated on the one hand as a generator and on the other hand as an electric motor.

In the context of the invention, it would also be conceivable that in the aforesaid drive unit the first planetary gearset of the motor vehicle transmission is arranged axially overlapping and radially inside the electric machine. This would produce a nested configuration of the drive unit, resulting in an axially compact overall structure.

A drive system that corresponds to one or more of the aforesaid variants in particular is part of a drive axle which is in this case provided for an electric vehicle. Preferably, the drive unit is arranged in a plane with drive output shafts which are each associated with at least one drive wheel and are coupled to the output shaft of the motor vehicle transmission. Advantageously, in that way a more compact structure of a drive axle with the drive unit can be produced, wherein the coupling between the output shaft of the motor vehicle transmission and the drive shafts of the drive axle is formed in particular by way of a differential gear system.

In the context of the invention at least one such drive axle is provided in an electric vehicle, which in particular is an electric utility vehicle. In that case the electric vehicle can be in particular an electrically powered transporter, or a light to medium-weight bus or truck.

In the context of the invention, to say that two structural elements are "connected" or "coupled" or "in connection with one another" in a rotationally fixed manner means that the said structural elements are permanently coupled, so that they cannot rotate independently of one another. Accordingly, between the said structural elements, which can be elements of the planetary gearsets and/or shafts and/or a rotationally fixed component of the transmission, no shifting element is provided, but rather, the corresponding structural elements are coupled with a fixed rotation speed ratio between them.

In contrast, if a shifting element is provided at least functionally between two structural elements, then the said structural elements are not permanently coupled to one another in a rotationally fixed manner, but rather, a rotationally fixed coupling is only formed by actuating the at least functionally intermediate shifting element. In that case, actuation of the shifting element means in the context of the invention that the shifting element concerned is changed to a closed condition and consequently the rotation movements of the structural elements coupled directly thereto are equalized. In the case when the shifting element concerned is in the form of an interlocking shifting element, the structural elements connected to one another directly by it will rotate at the same rotation speed, whereas in the case of a frictional shilling element there may be rotation speed differences between the structural elements even after the shifting element has been actuated. In the context of the invention this desired, or even undesired condition is nevertheless still referred to as a rotationally fixed connection between the respective structural elements.

The invention is not limited to the combination of features indicated in the principal claim or the claims that depend on it. There are further possibilities for combining individual features with one another, provided that they emerge from the claims, the description of preferred embodiments of the invention given below, or directly from the drawings. References in the claims to the drawings by the use of indexes should not be taken to restrict the protective scope of the claims.

BRIEF DESCRIPTION OF THE DRAWINGS

Advantageous embodiments of the invention, which will be explained in greater detail below, are illustrated in the drawings, which show.

DETAILED DESCRIPTION

Figure 1:
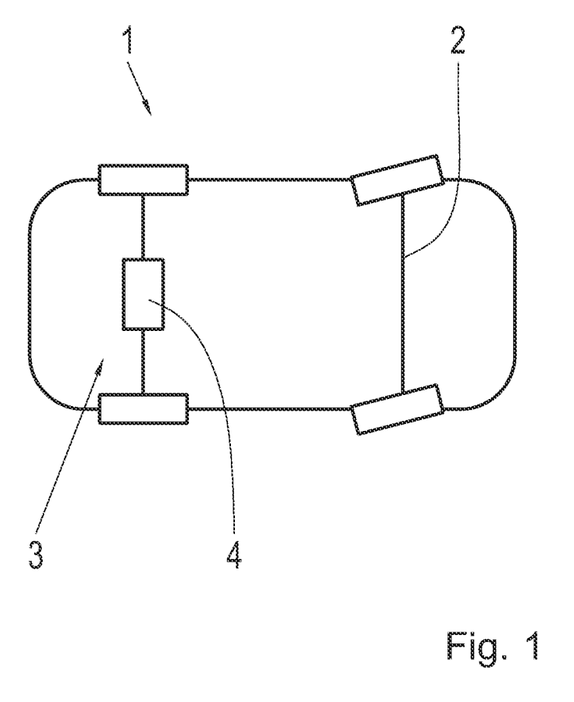
FIG. 1: A schematic representation of an electric vehicle corresponding to a preferred embodiment of the invention.

FIG. 1 shows a schematic representation of an electric vehicle 1, which in particular is an electric utility vehicle such as a transporter. Besides a steerable, non-driven axle 2, the electric vehicle 1 also has a drive axle 3 in which a drive unit 4 in the form of an electric axle-drive unit is provided. Whereas in this case the vehicle axle 2 is a front axle of the electric vehicle 1, the drive axle 3 is a rear axle of the electric vehicle 1. However, alternatively, or in addition to the drive axle 3, the vehicle axle 2 could also be designed as a driven axle.

Figure 2:
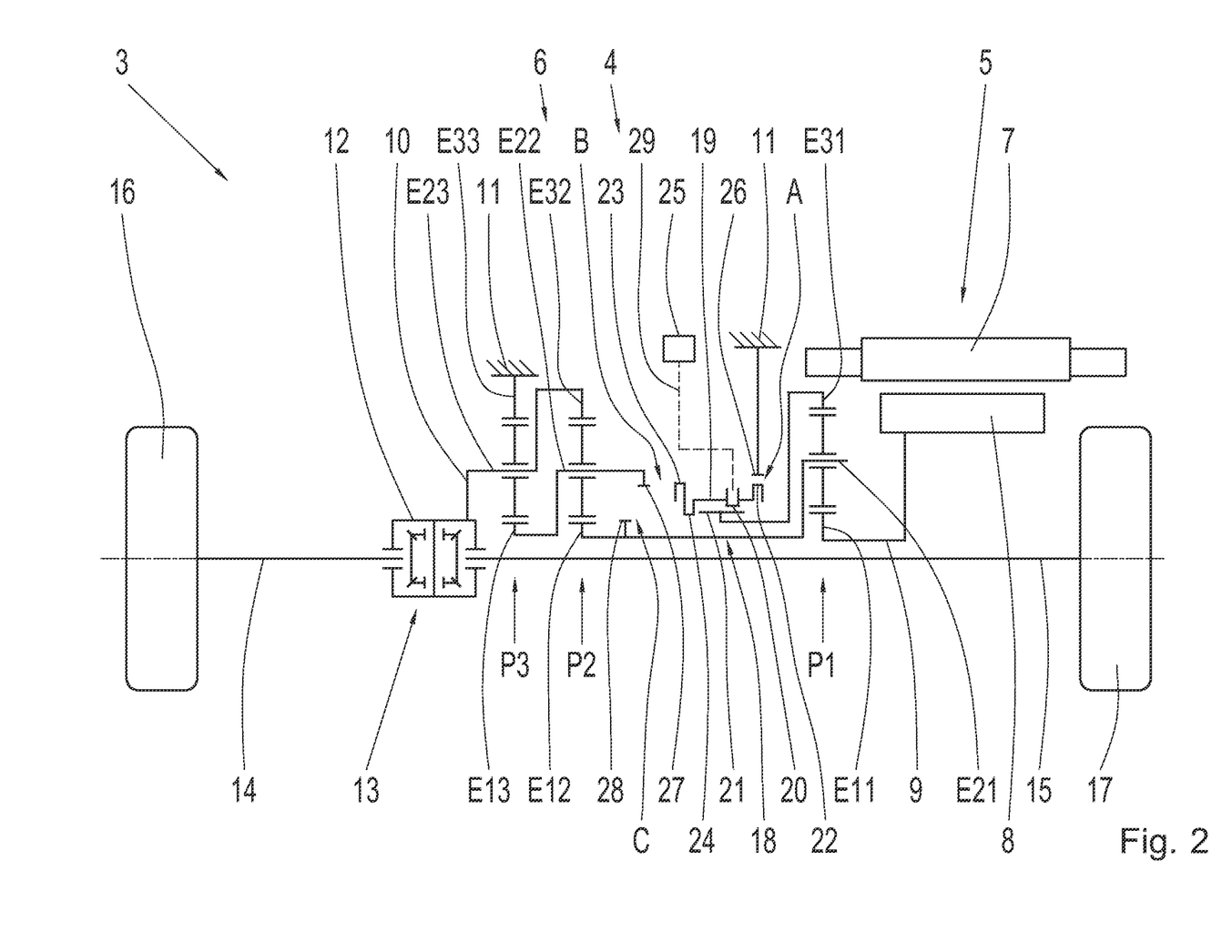
FIG. 2: A schematic view of a drive axle of the electric vehicle shown with a drive unit corresponding to a preferred embodiment of the invention.

FIG. 2 shows the drive axle 3 and in this case in particular the drive unit 4 in greater detail, the latter of which is made in accordance with a preferred embodiment of the invention. As can be seen, the drive unit 4 consists of an electric machine 5 and a motor vehicle transmission 6, which is configured in accordance with a preferred design option of the invention. In a manner whose principle is familiar to those with a knowledge of the subject, the electric machine 5 consists of a stator 7 and a rotor 8, such that the electric machine can be operated on the one hand as a generator and on the other hand as an electric motor.

Besides a drive input shaft 9 and a drive output shaft 10, the motor vehicle transmission 6 comprises three planetary gearsets P1, P2 and P3, each consisting respectively of a first element E11 or E12 or E13, a second element E21 or E22 or E23, and a third element E31 or E32 or E33. In this case the respective first element E11, E12 or E13 of the planetary gearset P1 or P2 or P3 is a sun gear in each case, whereas the respective second element E21, E22 or E23 of the planetary gearset P1 or P2 or P3 is a planetary web. In addition, the respective third element E31, E32 or E33 of the planetary gearset P1 or P2 or P3 is a ring gear of the planetary gearset P1 or P2 or P3 of the planetary gearset concerned.

On the respective planetary web of the planetary gearset concerned there is in each case at least one planetary gearwheel which is mounted to rotate, which meshes with the respective sun gear and also with the ring gear of the respective planetary gearset P1 or P2 or P3. Thus, the planetary gearsets P1, P2, and P3 are in this case all minus-planetary gearsets.

In the context of the invention, however, it can also be considered to make one or more of the planetary gearsets P1 to P3 as a plus-planetary gearset, and in that case, compared with their design as minus-planetary gearsets, the respective second element E21 or E22 or E23 will be a ring gear and the respective third element E31 or E32 or E33 will be the planetary web in each case. In addition, the stationary gear ratio of a respective planetary gearset made as a plus-planetary gearset must be increased by one compared with a design as a minus-planetary gearset. In a plus-planetary gearset, on the planetary web concerned at least one pair of planetary gearwheels are mounted to rotate, of which pair one planetary gearwheel meshes with the sun gear and one meshes with the ring gear, and the planetary gearwheels of the at least one pair of planetary gearwheels also mesh with one another.

In the present case the first element E11 of the first planetary gearset P1 is connected rotationally fixed to the drive input shaft 9, which is also connected rotationally fixed to the rotor 8 of the electric machine 5. Thus, the first element E11 of the first planetary gearset P1 and the rotor 8 are connected rotationally fixed to one another via the drive input shaft 9, so that the said first element E11 and the rotor 8 always rotate at the same rotation speed. In the context of the invention the first element E11 of the first planetary gearset P1 can be made integrally, as one piece with the drive input shaft 9. The second element E21 of the first planetary gearset P1 is permanently connected rotationally fixed to the first element E12 of the second planetary gearset P2, so that these two elements E21 and E12 also always rotate at the same rotation speed. Likewise, the second element E22 of the second planetary gearset P2 and the first element E13 of the third planetary gearset P3 are permanently connected rotationally fixed to one another, so that the second element E22 of the second planetary gearset P2 and the first element E13 of the third planetary gearset P3 always rotate together. The respective rotationally fixed connections in this case are preferably each formed by way of a respective intermediate shaft.

As can also be seen in FIG. 2, both the third element E33 of the third planetary gearset P3 is immobilized on a permanently fixed structural element 11 and is thus permanently prevented from rotating. In this case the said structural element 11 is preferably a transmission housing of the motor vehicle transmission 6, a part of such a transmission housing, or a component connected thereto in a rotationally fixed manner. In the context of the invention, in this case the third element E33 of the third planetary gearset P3 can be made integrally with the structural element 11. In contrast, the second element E23 of the third planetary gearset P3 and the third element E32 of the second planetary gearset P2 are connected rotationally fixed to one another and to the output shaft 10 of the motor vehicle transmission 6, so that the second element E23 of the third planetary gearset P3 and the third element E32 of the second planetary gearset P2 always rotate together with the output shaft 10. Accordingly, the second element E23 of the third planetary gearset P3 can if necessary be made integrally with the output shaft 10.

Besides the second element E23 of the third planetary gearset P3, the output shaft 10 is also permanently connected rotationally fixed to a differential cage 12 of a differential gear system. This differential gear system 13 is in the form of a conical gear differential, which in a manner whose principle is known to those familiar with the subject, distributes a drive power passing into the differential cage 12 by way of the output shaft 10, to drive output shafts 14 and 15 of the drive axle 3. In driving connection with the drive output shafts 14 and 15, there is a respective drive wheel 16 or 17 of the drive axle 3.

In the motor vehicle transmission 6 a shifting device 18 is also provided, by means of which various couplings with interlock can be effected. Here, the shifting device 18 is an unsynchronized shifting device which reproduces the function of three shifting elements A, B, and C, as indicated in FIG. 2. The shifting device 18 comprises a coupling element 19 which is designed in the form of a sliding sleeve and is guided on a guiding tooth array 20, rotationally fixed and axially displaceable on teeth 21. In this case the said teeth 21 are connected rotationally fixed to the third element E31 of the first planetary gearset P1. In addition, the coupling element 19 is provided with first engagement teeth 22, second engagement teeth 23, and third engagement teeth 24, and can be moved by an associated positioning actuator 25 to three different shift positions and two intermediate neutral positions. The positioning actuator 25 is preferably an electro-mechanical actuator.

In a first shift position the coupling element 19 of the shifting device 18 engages with the engagement teeth 22 in a tooth array 26 which is connected rotationally fixed to the structural element 11. Thereby, an actuated condition of the shifting element A is functionally obtained, in which the third element E31 of the first planetary gearset P1 is fixed by way of the coupling element 19 to the rotationally fixed structural element 11 and is thus prevented from rotating. This first shift position of the coupling element 19 is the one shown in FIG. 2.

From the first shift position the coupling element 19 of the shifting device 18 can be moved by the positioning actuator 25 to a first neutral position, in which the meshing engagement between the engagement teeth 22 and the teeth 26 is released and in which the third element E31 of the first planetary gearset P1 is decoupled. From the first neutral position further axial movement, besides changing from the first shift position, also moves the coupling element 19 to a second shift position in which the engagement teeth 23 mesh with teeth 27. These teeth 27 are connected rotationally fixed to the second element E22 of the second planetary gearset P2 and to the first element E13 of the third planetary gearset P3. The result of that engagement is that the third element E31 of the first planetary gearset P1 is connected rotationally fixed by way of the coupling element 19 to the second element E22 of the second planetary gearset P2 and to the first element E13 of the third planetary gearset P3. Thus, this second shift position of the coupling element 19 corresponds functionally to an actuated condition of the shifting element B.

From the second shift position the coupling element 19 can be moved by the positioning actuator 25 on the one hand in one axial direction back to the first neutral position, or alternatively in the other axial direction to a second neutral position in which the third element E31 of the first planetary gearset P1 is again completely decoupled.

The positioning actuator 25 can move the coupling element 19 from the second neutral position, on the one hand back to the second shift position and on the other hand, by an axial movement in the opposite direction, to a third shift position. In this third shift position, with its engagement teeth 24 the coupling element 19 engages with teeth 28, which are permanently connected rotationally fixed to the second element E21 of the first planetary gearset P1 and the first element E12 of the second planetary gearset P2. This reproduces the actuated condition of the shifting element C, in which the third element E31 of the first planetary gearset P1 is connected rotationally fixed to the second element E21 of the first planetary gearset P1 and to the first element E12 of the second planetary gearset P2. Owing to the rotationally fixed connection between the second element E21 and the third element E31 of the first planetary gearset P1, this results in blocking of the first planetary gearset P1 which then rotates as a block.

In the present case the drive unit 4 is arranged parallel to e drive axle 3 and in a plane with the drive output shafts 14 and 15, so that the drive unit 4 is arranged axially between the drive wheels 16 and 17. In this case the electric machine 5 is arranged axially adjacent to the drive wheel 17, and the first planetary gearset P1 of the motor vehicle transmission 6 is positioned axially at the level of, and radially inside the stator 7 of the electric machine 5. Axially after the first planetary gearset P1 there follow first the second planetary gearset P2 and then the third planetary gearset P3 and the differential 13, in such manner that the latter, together with the planetary gearsets P1 to P3, can be accommodated in a transmission housing of the motor vehicle transmission 6.

The shifting device 18 is positioned axially between the first planetary gearset P1 and the second planetary gearset P2, so that in this case the shifting device 18 is specifically arranged axially between the third planetary gearset P2 and a radial connection of the teeth 26 on the structural element 11. The positioning actuator 25 of the shifting device 18 is positioned axially also between the second planetary gearset P2 and the said radial connection and radially around the two planetary gearsets P1 and P2, in such manner that the positioning actuator 25 is coupled to the coupling element 19 by way of a shifting rod 29.

Figure 3:
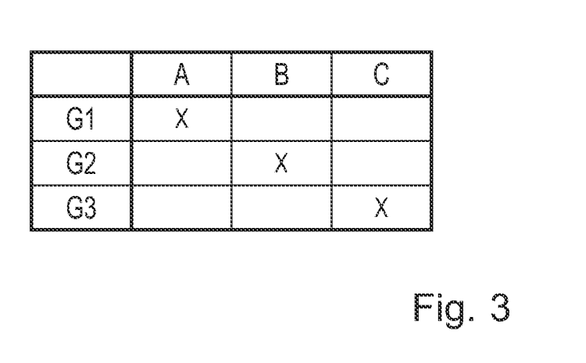
FIG. 3: An example of a shifting scheme of a motor vehicle transmission of the drive unit shown in FIG. 2.

Furthermore, FIG. 3 shows an example shifting scheme for the motor vehicle transmission 6 in FIG. 2. It can be seen that in the motor vehicle transmission 6 a first gear G1, a second gear G2, and a third gear G3 can be engaged, and in the table of FIG. 3 an X is used in each case to indicate which of the shifting elements A, B, and C reproduced by the shifting device 18 has to be actuated. As described earlier, to produce an actuated condition of the shifting element A or B or C concerned, the coupling element 19 is moved to the respectively associated shift position.

The first gear G1 between the drive input shaft 9 and the drive output shaft 10 is obtained by actuating the shifting element A. Accordingly, in that case the third element E31 of the first planetary gearset P1 is fixed by the coupling element 19 to the structural element 11.

In contrast, to engage the second gear G2 the shifting element B has to be functionally actuated, so that the third element E31 of the first planetary gearset P1 is now connected rotationally fixed to the second element E22 of the second planetary gearset P2 and to the first element E13 of the third planetary gearset P3. Accordingly, to shift from the first gear G1 to the second gear G2 the coupling element 19 of the shifting device 18 has to be moved from the first shift position (actuated condition of the shifting element A), through the first neutral position and to the second shift position (actuated condition of the shifting element B).

Finally, the third gear G3 of the motor vehicle transmission 6 is engaged by functionally actuating the shifting element C. Correspondingly, in the shifting device 18 the coupling element 19 has to be moved to the shift position in which the engagement teeth 24 mesh with the teeth 28. Thereby, the third element E31 of the first planetary gearset P1 is connected rotationally fixed to the second element E21 of the first planetary gearset P1 so that the first planetary gearset P1 is blocked. To shift from the second gear G2 to the third gear G3, the coupling element 19 of the shifting device 18 has to be moved from the second shift position (actuated condition of the shilling element B) through the second neutral position to the third shift position (actuated condition of the shifting element C). During respective gearshifts between the gears G1 to G2 and G2 to G3, the requisite synchronized rotation speeds at the coupling element 19 are set by means of the electric machine 5 by corresponding rotation speed regulation.

By virtue of the design of a motor vehicle transmission according to the invention, different gears can be engaged by compact means.

INDEXES

1 Electric vehicle
2 Vehicle axle
3 Drive axle
4 Drive unit
5 Electric machine
6 Motor vehicle transmission
7 Stator
8 Rotor 9 Drive input shaft
10 Drive output shaft
11 Structural element
12 Differential cage
13 Differential gear system
14 Drive output shaft
15 Drive output shaft
16 Drive wheel
17 Drive wheel
18 Shifting device
19 Coupling element
20 Guiding tooth array
21 Teeth
22 Engagement teeth
23 Engagement teeth
24 Engagement teeth
25 Positioning actuator
26 Teeth
27 Teeth
28 Teeth
29 Shifting rod
P1 First planetary gearset
P2 Second planetary gearset
P3 Third planetary gearset
E11 First element of the first planetary gearset
E21 Second element of the first planetary gearset
E31 Third element of the first planetary gearset
E12 First element of the second planetary gearset
E22 Second element of the second planetary gearset
E32 Third element of the second planetary gearset
E13 First element of the third planetary gearset
E23 Second element of the third planetary gearset
E33 Third element of the third planetary gearset
A Shifting element
B Shifting element
C Shifting element
G1 First gear
G2 Second gear
G3 Third gear

The invention claimed is:

1. A motor vehicle transmission, comprising:
a drive input shaft configured for connection to a drive machine;
a drive output shaft;
a first planetary gearset, a second planetary gearset, and a third planetary gearset, each comprising a first element, a second element, and a third element in a form, respectively, of a sun gear, a planetary web, and a ring gear;
a first shifting element, a second shifting element, and a third shifting element or functional equivalents thereof;
wherein the first element of the first planetary gearset is connected rotationally fixed to the drive input shaft and the second element of the third planetary gearset is connected rotationally fixed to the drive output shaft; and
wherein:
the third element of the third planetary gearset is immobilized,
the third element of the second planetary gearset is connected rotationally fixed to the second element of the third planetary gearset and to the output shaft,
the second element of the first planetary gearset is connected rotationally fixed to the first element of the second planetary gearset,
the second element of the second planetary gearset is connected rotationally fixed to the first element of the third planetary gearset,
the third element of the first planetary gearset can be immobilized by means of the first shifting element and is connected rotationally fixed to the second element of the second planetary gearset and to the first element of the third planetary gearset by means of the second shifting element,
and two of the elements of the first planetary gearset can be brought into connection with one another by means of the third shifting element.

2. The motor vehicle transmission according to claim 1, wherein:
a first gear between the drive input shaft and the drive output shaft is obtained by closing the first shifting element (A);
a second gear between the drive input shaft and the drive output shaft is obtained by actuating the second shifting element; and
a third gear between the drive input shaft and the drive output shaft is obtained by closing the third shifting element.

3. The motor vehicle transmission according to claim 1, wherein each of the shifting elements is configured as an interlocking shifting element.

4. The motor vehicle transmission according to claim 1, wherein actuating the third shifting element connects the third element of the first planetary gearset rotationally fixed to the second element of the first planetary gearset.

5. The motor vehicle transmission according to claim 4, wherein the first shifting element, the second shifting element and the third shifting element are formed by a shifting device, the shifting device having a coupling element configured to be positioned in a first shift position, a second shift position, and a third shift position, wherein in the first shift position the coupling element functionally reproduces an actuated condition of the first shifting element and immobilizes the third element of the first planetary gearset, wherein in the second shift position the coupling element functionally reproduces an actuated condition of the second shifting element and connects the third element of the first planetary gearset rotationally fixed to the second element of the second planetary gearset and to the first element of the third planetary gearset, and wherein in the third shift position the coupling element functionally reproduces an actuated condition of the third shifting element and connects the third element of the first planetary gearset rotationally fixed to the second element of the first planetary gearset.

6. The motor vehicle transmission according to claim 5, wherein the drive output shaft is coupled to an input side of a differential gear system.

7. The motor vehicle transmission according to claim 5, wherein the planetary gearsets are arranged after a connection point of the drive input shaft that serves to couple the drive input shaft to the drive machine, in a sequence of the first planetary gearset, the second planetary gearset, and the third planetary gearset.

8. The motor vehicle transmission according to claim 7, the first shifting element, the second shifting element, and the third shifting element are arranged axially between the first planetary gearset and the second planetary gearset.

9. The motor vehicle transmission according to claim 8, further comprising a positioning actuator, by means of which the coupling element of the shifting device that functionally reproduces the first shifting element, the second shifting element, and the third shifting element can be moved to the first shift position, the second shift position, and the third shift position, the positioning actuator is located axially between the first planetary gearset and the second planetary gearset.

10. An electric axle-drive unit for an electric vehicle, the drive unit comprising:
   an electric machine having a rotor; and
   the motor vehicle transmission according to claim 1;
   wherein the rotor of the electric machine is coupled to the drive input shaft of the motor vehicle transmission.

11. The electric axle-drive unit according to claim 10, wherein the first planetary gearset of the motor vehicle transmission is positioned axially at a level of and radially inside the electric machine.

12. A drive axle for an electric vehicle, comprising a drive unit according to claim 10.

13. The drive axle according to claim 12, wherein the drive unit is arranged in a plane with drive output shafts, which are in each case associated with at least one drive wheel and are coupled to the drive output shaft of the motor vehicle transmission.

14. An electric vehicle, comprising at least one drive axle according to claim 12.

15. A drive axle for an electric vehicle (1), comprising the drive unit according to claim 10, wherein the first planetary gearset of the motor vehicle transmission is positioned axially at a level of and radially inside the electric machine.

16. The motor vehicle transmission of claim 1, wherein each of the shifting elements is configured as an unsynchronized claw-type shifting element.

* * * * *